(No Model.)
A. M. KNELL.
SEED DRILLING HARROW.
No. 290,244. Patented Dec. 18, 1883.
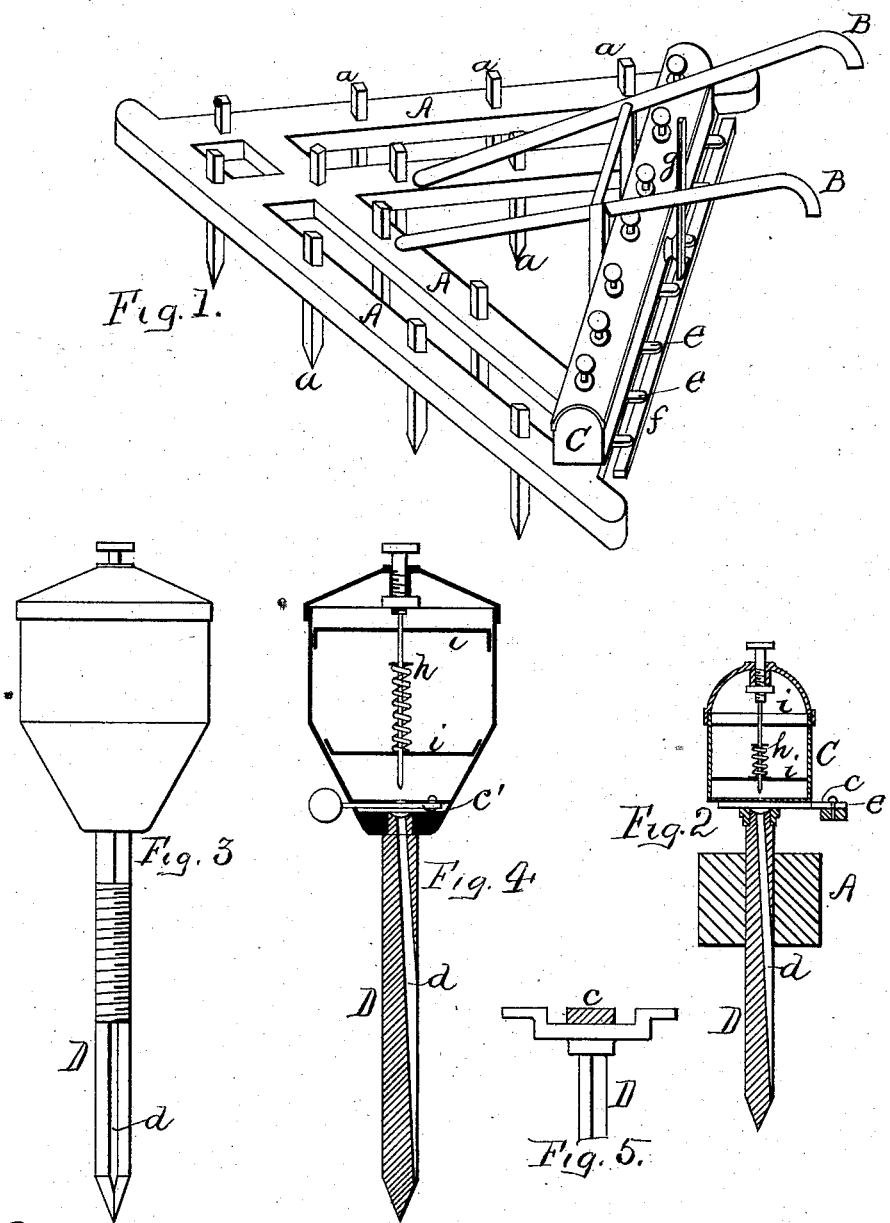

UNITED STATES PATENT OFFICE.

ANDREW M. KNELL, OF ELLICOTT CITY, MARYLAND.

SEED-DRILLING HARROW.

SPECIFICATION forming part of Letters Patent No. 290,244, dated December 18, 1883.

Application filed January 24, 1883. (No model.)

*To all whom it may concern:*

Be it known that I, ANDREW M. KNELL, a citizen of the United States, residing at Ellicott City, in the county of Howard and State of Maryland, have invented certain new and useful Improvements in Seed-Drilling Harrows, of which the following is a specification, reference being had to the accompanying drawings, in which—

Figure 1 is a perspective view of a harrow having my improvements applied. Fig. 2 is a sectional view, showing the interior construction of the hoppers and teeth. Fig. 3 is an elevation, and Fig. 4 is a vertical section through my improvements as applied to a single tooth; and Fig. 5 is a detail section of Fig. 2.

Referring to the drawings by letter, A is the frame, B the handles, and $a$ the teeth, of an ordinary harrow. C is a long hopper or seed-receptacle, shaped in section as shown in Fig. 4, to receive seed, and may consist of one or a series of compartments.

Secured to the frame A below the hopper C is a series of drill-teeth, D, each of which is formed with a longitudinal channel or seed-duct, $d$, extending obliquely downward from the upper end of said tooth, and terminating at its lower end in an elongated opening extending at the rear side of the tooth from near its lower extremity to near the under side of the harrow-frame, or, in other words, being so placed as to extend about an inch below ground when harrowing. The seed is conveyed through this duct from the hopper to the furrow.

The hoppers C are each provided with a cut-off valve, $c$, by which the supply of seed may be cut off, the handles $e$ of which are connected by a bar, $f$, which in turn is surmounted by a hand-lever, $g$, by which all the valves may be simultaneously operated when desired.

In the hopper, above the tooth, is mounted a spring-sustained pin, $h$, upheld by two cross-bars, $i$, which pin may be tapped upon in any desired manner, causing its lower end to descend through the feed-opening in the bottom of the hopper and through the cut-off aperture, and also to enter the upper end of the perforation in the tooth, should it by any means become clogged up.

In Figs. 3 and 4 are shown views of another mode of connecting my improved device to an ordinary harrow, in which each tooth is provided a separate hopper and cut-off mechanism with spring-pin. In all other respects the constructions are the same as corresponding devices in Figs. 1 and 2. These individual teeth and hoppers may be placed in any part of the harrow-frame as substitutes for the ordinary teeth, $a$, each of my teeth being provided with a screw-thread, by which it can be secured in the frame A, as shown in Fig. 3.

My improvements are especially useful in drilling in clover-seed or other seed—such as timothy—when harrowing grain, but may be used for the same purpose at any time.

Having thus fully described my invention, I claim as new and desire to secure by Letters Patent—

1. The combination, with a hopper provided with a spring-sustained clearing-bar, of a drill-tooth secured to the bottom of said hopper, and formed with an oblique longitudinal seed-duct communicating with the interior of said hopper, and opening at the rear side of said tooth in such manner as to deliver the seed into the furrow.

2. The hopper with its spring-sustained clearing-bar, constructed and arranged substantially as described, and the cut-off valve, in combination with the drill-tooth provided with the oblique longitudinal duct extending from the upper end to the lower part of the rear side of said tooth, for the purposes specified.

3. The hopper, with the cut-offs and the spring-sustained clearing-bar, and drill-tooth with its oblique longitudinal duct, in combination with the connecting-bar $f$ and its operating-lever $g$, substantially as and for the purposes set forth.

4. The hopper provided with two cross-bars, a pin supported by said cross-bars and normally held up by a spring, and the lid having pin loosely mounted in a vertical line over the spring-pin, the two pins being in a direct line over the opening in the bottom of the hopper, as set forth.

5. The drill-tooth provided with the oblique longitudinal duct or channel, and with means for its attachment to the harrow-frame, substantially as described.

In testimony whereof I have hereto appended my signature in presence of two subscribing witnesses.

ANDREW M. KNELL.

Witnesses:
SHIPLEY BRASHEARS,
JNO. T. MADDOX.